UNITED STATES PATENT OFFICE.

JOHN L. STEWART AND JAMES L. HASTINGS, OF PHILADELPHIA, PENNSYLVANIA, ASSIGNORS, BY MESNE ASSIGNMENTS, TO THE WELSBACH INCANDESCENT GAS LIGHT COMPANY, OF JERSEY CITY, NEW JERSEY.

PLASTIC MINERAL COMPOSITION, &c.

SPECIFICATION forming part of Letters Patent No. 396,303, dated January 15, 1889.

Application filed October 31, 1885. Serial No. 181,473. (No specimens.)

*To all whom it may concern:*

Be it known that we, JOHN L. STEWART and JAMES L. HASTINGS, citizens of the United States, residing at Philadelphia, in the county of Philadelphia, State of Pennsylvania, have invented certain new and useful Improvements in Plastic Mineral Compositions and Vitreous or Crystalline Compounds, of which the following is a specification.

This invention relates to a new plastic mineral composition and vitreous or crystalline compound for use in chemical and other arts and for incandescent illumination, said composition being adapted for molding into articles of various forms and for coating metallic and other articles to protect them from the oxidizing and corroding influences of air, moisture, acids, &c., and from injury by heat. The plastic compound when properly burned or fired is highly refractory, very hard, crystalline in structure, rough on the surface, white or opalescent, and practically infusible.

The object of the invention is to produce a readily incandescing compound, capable of resisting the action of intense heat, and particularly adapted for forming incandescent burners or attachments for burners for illumination with coal-gas, water-gas, or natural gas. The plastic compound is formed of a mixture of ingredients in about the following proportions: calcium oxide or carbonate, sixty-five grains; magnesia oxide or carbonate, fifty grains; strontia oxide or carbonate, thirty grains; alumina oxide or carbonate, fifteen grains; cryolite, twenty grains.

The materials are ground dry or in oil or water or glycerine, and the resulting pulverized material is intimately mixed in glycerine or its equivalent to the proper consistency for convenient handling or application. The mixture of ingredients having been properly effected, the compound is molded into the desired articles or coated upon articles of metal or other material, and in such forms is subjected to a suitable temperature to drive off the moisture or volatile matter, and then to a high temperature in a gas or other furnace, and may afterward be suspended in a gas flame or placed in burning gas in the open air for completing the process of burning and for testing and proving the finished articles.

The proportions of mineral ingredients above mentioned for forming the compound and various forms of burner attachments for illumination with gas give satifactory results; but we do not limit ourselves to the proportions stated, as other proportions will give good results, and they may be varied without departing from our invention.

It is to be noted that the mineral ingredients may be pulverized in the dry condition, and the glycerine or the hydrocarbon or other oil afterward added.

Having described our invention, what we claim, and desire to secure by Letters Patent, is—

1. A composition for forming a refractory crystalline compound, consisting of calcium oxide or carbonate, magnesia oxide or carbonate, strontia oxide or carbonate, alumina oxide or carbonate, cryolite, and glycerine, hydrocarbon oil, or their equivalent.

2. A refractory crystalline compound composed of calcium oxide or carbonate, magnesia oxide or carbonate, strontia oxide or carbonate, alumina oxide or carbonate, and cryolite, said compound being white or opalescent, rough on the surface, and practically infusible.

In testimony whereof we affix our signatures in presence of two witnesses.

JOHN L. STEWART.
JAMES L. HASTINGS.

Witnesses:
CHAS. MATHEWS, Jr.,
FRED. SCHUR.